United States Patent
Hirai

(10) Patent No.: US 7,061,641 B2
(45) Date of Patent: Jun. 13, 2006

(54) OUTPUT CONTROL APPARATUS, OUTPUT CONTROL METHOD, STORAGE MEDIUM AND PROGRAM FOR OUTPUTTING IMAGE DATA

(75) Inventor: Tatsuhiko Hirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 907 days.

(21) Appl. No.: 09/795,316

(22) Filed: Mar. 1, 2001

(65) Prior Publication Data

US 2001/0019423 A1 Sep. 6, 2001

(30) Foreign Application Priority Data

Mar. 3, 2000 (JP) .............. 2000/059528
Mar. 3, 2000 (JP) .............. 2000/059529

(51) Int. Cl.
*G06K 15/00* (2006.01)
*G06F 3/12* (2006.01)

(52) U.S. Cl. ............ 358/1.18; 358/1.14; 358/1.15
(58) Field of Classification Search ......... 358/1.1–1.18
See application file for complete search history.

(56) References Cited

U.S. PATENT DOCUMENTS 5,671,277 A * 9/1997 Ikenoue et al. ............. 713/179
6,466,328 B1 * 10/2002 Bradley et al. ............. 358/1.15
6,750,987 B1 * 6/2004 Murata ...................... 358/474

* cited by examiner

*Primary Examiner*—Douglas Q. Tran
(74) *Attorney, Agent, or Firm*—Fitzpatrick, Cella, Harper & Scinto

(57) ABSTRACT

An output control apparatus includes a reader for reading, from a storage medium in which image data and image output instruction data are written, the image data and the image output instruction data. The image data read by the reader is output to an image output device designated based on the read image output instruction data. In doing so, the work of designating a printer, which was previously manually performed for each image, is now automatically performed. For example, an image in a memory card can be directly printed by a printer at a remote print shop via a network.

50 Claims, 9 Drawing Sheets

FIG. 2A

| 21 | 22 |
|---|---|
| IMAGE PROCESSING DATA REGION | IMAGE DATA REGION |

FIG. 2B

| 23 | 24 | 25 | 26 | 27 |
|---|---|---|---|---|
| [ HEADER SECTION ]<br>· SAVE DATE<br>· USER NAME<br>· USER ADDRESS<br>· USER PHONE NUMBER | [ JOB001 ]<br>· PRODUCT ID<br>· PRINT COUNT<br>· IMGXXX<br>· IMAGE FORMAT | [ JOB002 ]<br>· PRODUCT ID<br>· PRINT COUNT<br>· IMGXXX<br>· IMAGE FORMAT | [ JOB003 ]<br>· PRODUCT ID<br>· PRINT COUNT<br>· IMGXXX<br>· IMAGE FORMAT | [ JOB004 ]<br>· PRODUCT ID<br>· PRINT COUNT<br>· IMGXXX<br>· IMAGE FORMAT |

| 28 | 29 | 30 | 31 | 32 |
|---|---|---|---|---|
| [ IMG001 ] | [ IMG002 ] | [ IMG003 ] | [ IMG004 ] | [ IMG005 ] |

```
[ HDR ]
SAVE DATE = 1999/12/15
USER NAME = YAMADA TARO
PHONE NUMBER   = 03-1234-5678

[ JOB ]
PRT PID = 001
PRINT TYPE = NORMAL
PRINT CNT = 1
PAPER SIZE = A4
IMG FMT = JPG
DTN PRN = 152. 15. 12. 122
IMG SRC = ". . /ABCD/IMG001"

[ JOB ]
PRT PID = 002
PRINT TYPE = DOUBLE
PRINT CNT = 3
PAPER SIZE = A4
IMG FMT = JPG
DTN PRN = 152. 15. 12. 123
IMG SRC = ". . /ABCD/IMG002"

[ JOB ]
PRT PID = 003
PRINT TYPE = NORMAL
PRINT CNT = 5
PAPER SIZE = AUTO
IMG FMT = JPG
DTN PRN = 152. 15. 12. 122
IMG SRC = ". . /ABCD/IMG004"

[ JOB ]
PRT PID = 004
PRINT TYPE = NORMAL
PRINT CNT = 5
PAPER SIZE = AUTO
IMG FMT = JPG
DTN PRN = COLOR PRN
IMG SRC = ". . /ABCD/IMG004"
```

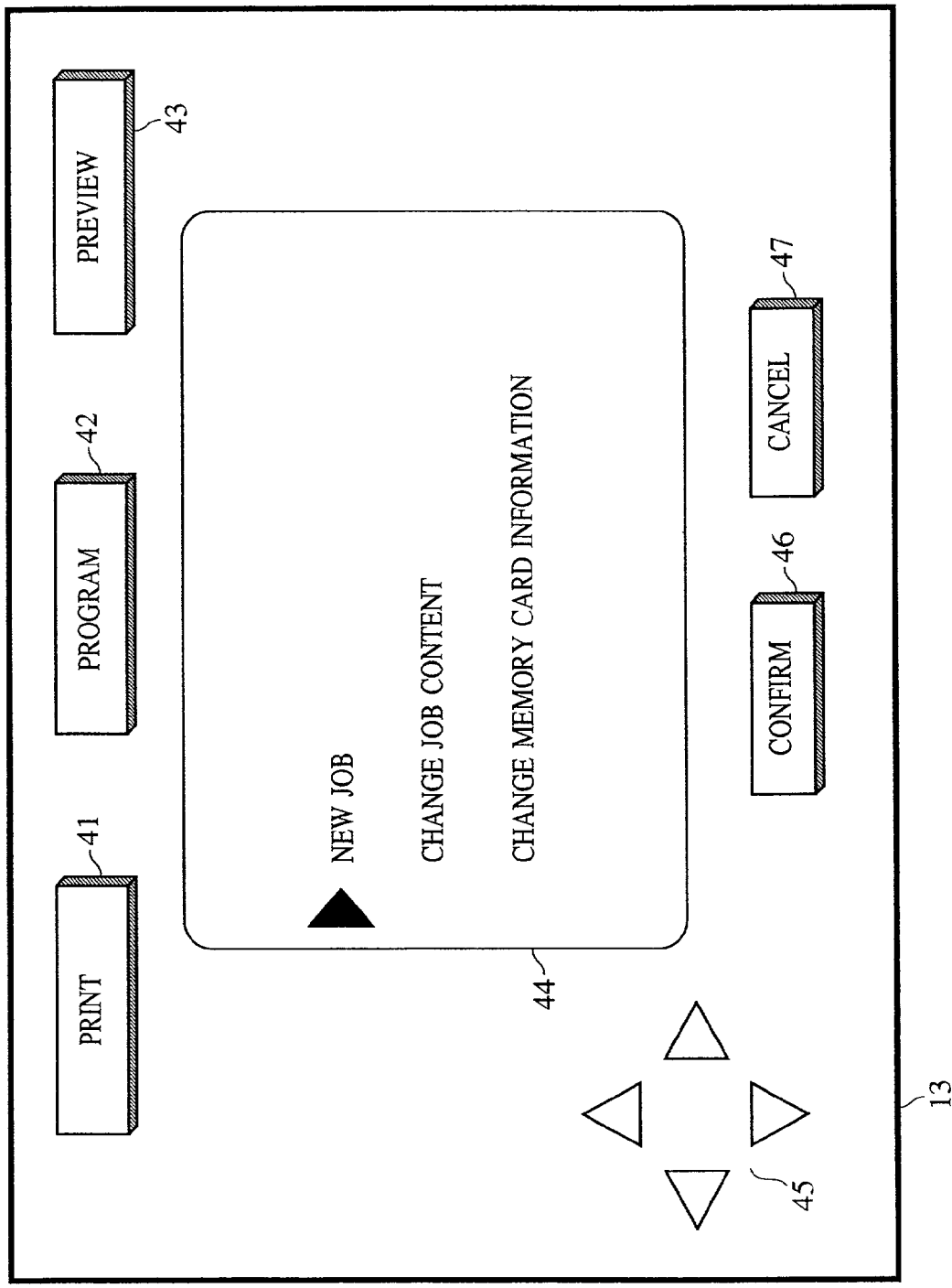

FIG. 8A
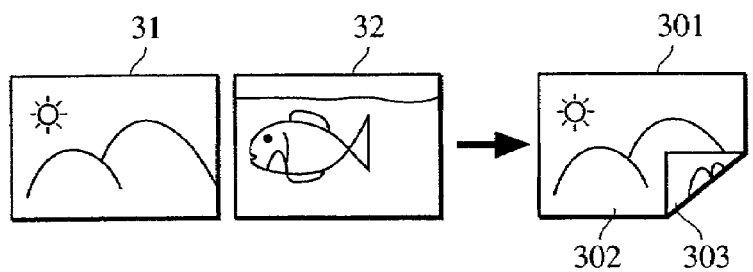
FIG. 8B
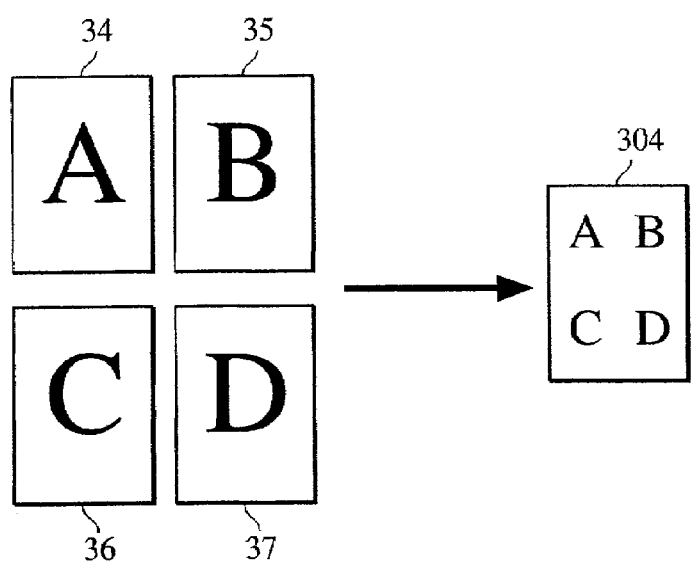
FIG. 8C
FIG. 8D
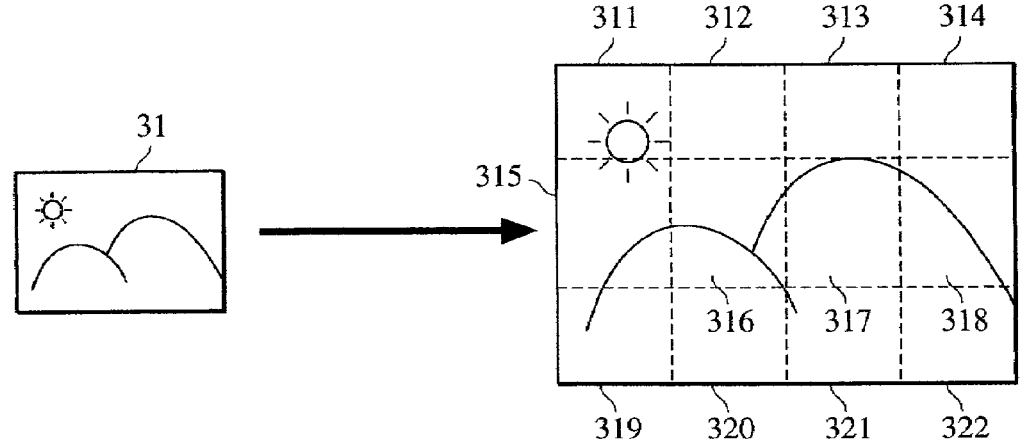

OUTPUT CONTROL APPARATUS, OUTPUT CONTROL METHOD, STORAGE MEDIUM AND PROGRAM FOR OUTPUTTING IMAGE DATA

BACKGROUND OF THE INVENTION

1. Field of the Invention

The present invention relates to output control technology for outputting image data recorded in storage media.

2. Description of the Related Art

Recently, as personal computers and image input apparatuses such as digital cameras have come into wider use, individuals have become able to freely handle high-definition digital image data. These image data are recorded in predetermined information storage media in various image file formats, such as the Joint Photographic Experts Group (JPEG) which is the international standard for compressing still images, the Moving Picture Experts Group (MPEG) which is the international standard for compressing color motion video, the PICTure (PICT) which is a graphics data file format, and the Tagged Image File Format (TIFF) which is a graphics data file format. The image data are generally output by printers owned by individuals. The printers owned by individuals are limited in performing high-quality and high-definition printing.

To meet the demands for high-quality and high-definition printing, services for outputting image data recorded in information storage media by high-performance and high-definition printers are provided at desktop publishing (DTP) shops, personal computer shops, photo studios, and convenience stores.

These service shops receive, from customers, information storage media such as SmartMedia (trademark of Toshiba Corporation), CompactFlash (trademark of SanDisk Corporation) memory, compact disk-recordable (CD-R), floppy disks, and the like in which images are stored. The image data in the information storage media are read by a personal computer or the like, and subsequently the read image data are output by a high-resolution color printer, a dye-sublimation printer, or the like.

When accepting services for printing image data stored in the foregoing information storage media, it is necessary to designate which image data among those recorded in the information storage media should be output. Therefore, a customer who is going to accept printing services is required to inform an image printing service staff of a desired image from among image data recorded in an information storage medium using an application form such as a request memo in which the identification number and a name associated with each image are indicated.

The image printing service staff selects the user's desired image from among the image data recorded in the information storage medium based on the identification number and the name of the image designated in the application form such as the request memo received from the customer.

In general, computer systems for performing the foregoing printing services require complicated operations. It is in practice not easy for an ordinary shop staff who is not a computer engineer to select an image designated by a customer by manually operating the computer system and to execute printing. Since it is necessary to select and extract desired images from among image data recorded in an information storage medium by manually operating the computer system, actual printing is disadvantageous in that it requires substantially a lot of labor and a long period of time.

In order to overcome such disadvantages, a printing system is proposed in which image data and JOB information required for outputting the image data are stored in an information storage medium. The printing system includes an information storage medium reader for reading image data and the content of a print job from the information storage medium. The printing system automatically performs printing in accordance with the print job read from the information storage medium.

Various types of images may be mixed and stored in an information storage medium. For example, black-and-white images, color images, low-resolution images, high-resolution images, and the like may be stored in an information storage medium. In such a case, a shop staff under most circumstances separately selects the most appropriate printer in accordance with an image and outputs data to the most appropriate printer since the outputting of a black-and-white image by a color printer and the outputting of low-resolution image data by a high-definition printer cause deterioration in the quality of images and incur unnecessary cost.

When the shop staff individually selects and designates a printer to which each image is output, the outputting of images require labor and time.

For example, when performing the double-sided outputting, the index-printing of arbitrary images, and the enlarging and outputting of an image onto a plurality of sheets of paper so as to make a poster, the demands are beyond simple image outputting. In such cases, the shop staff is required to be substantially skilled, and it requires a long period of time to perform output operations. For these reasons, disadvantages are caused for users in the areas of cost and time.

SUMMARY OF THE INVENTION

Accordingly, it is an object of the present invention to provide an output control system, an output control apparatus, an output control method, a storage medium, and a program product for a printer system or the like for a printer system that outputs image data recorded in recording media.

To solve the foregoing problems, it is another object of the present invention to provide an output control apparatus, an output control method, and a recording medium storing an output control program, for automatically designating a printer, which has been conventionally performed by hand for each image, and for directly printing an image in a storage medium by, for example, a printer at a remote printing shop via a network.

According to an aspect of the present invention, the foregoing objects are achieved through provision of an output control apparatus including a reading unit for reading, from a storage medium in which image data and image data instruction data are written, the image data and the image output instruction data. An output unit outputs the image data read by the reading unit to an image output device designated based on the image output instruction data read by the reading unit.

According to another aspect of the present invention, the foregoing objects are achieved through provision of an output control method comprising a reading step of reading, from a storage medium in which image data and image output instruction data are written, the image data and the image output instruction data. In an output step, the image data read in the reading step is output to an image output device designated based on the image output instruction data read in the reading step.

According to another aspect of the present invention, the foregoing objects are achieved through provision of a storage medium having recorded thereon an output control program. The output control program includes a reading step of reading, from a storage medium in which image data and image output instruction data are written, the image data and the image output instruction data. In an output step, the image data is output to an image output device designated based on the image output instruction data read in the reading step.

According to another aspect of the present invention, the foregoing objects are achieved through provision of an output control system including a plurality of image output devices for outputting images based on image data. A reading unit reads, from a storage medium in which image data and image output instruction data are written, the image data and the image instruction data. An output unit outputs the image data read by the reading unit to one of the image output devices designated based on the image output instruction data read by the reading unit.

Further objects, features, and advantages of the present invention will become apparent from the following description of the preferred embodiments with reference to the attached drawings.

BRIEF DESCRIPTION OF THE DRAWINGS

FIGS. 2A to 2C are memory maps indicating examples of memory mapping in an information storage medium shown in FIG. 1;

FIG. 3 illustrates examples of JOB sections stored in the information storage medium shown in FIG. 1;

FIG. 4 is a plan view of an example of a display of a system display unit in an information transmitting unit shown in FIG. 1;

FIGS. 8A to 8D illustrate examples of actual images output by an image output control system according to the second embodiment of the present invention.

DESCRIPTION OF THE PREFERRED EMBODIMENTS

The present invention will be understood from the following description of the preferred embodiments with reference to the accompanying drawings.

Overview of Image Forming System

Figure 1:
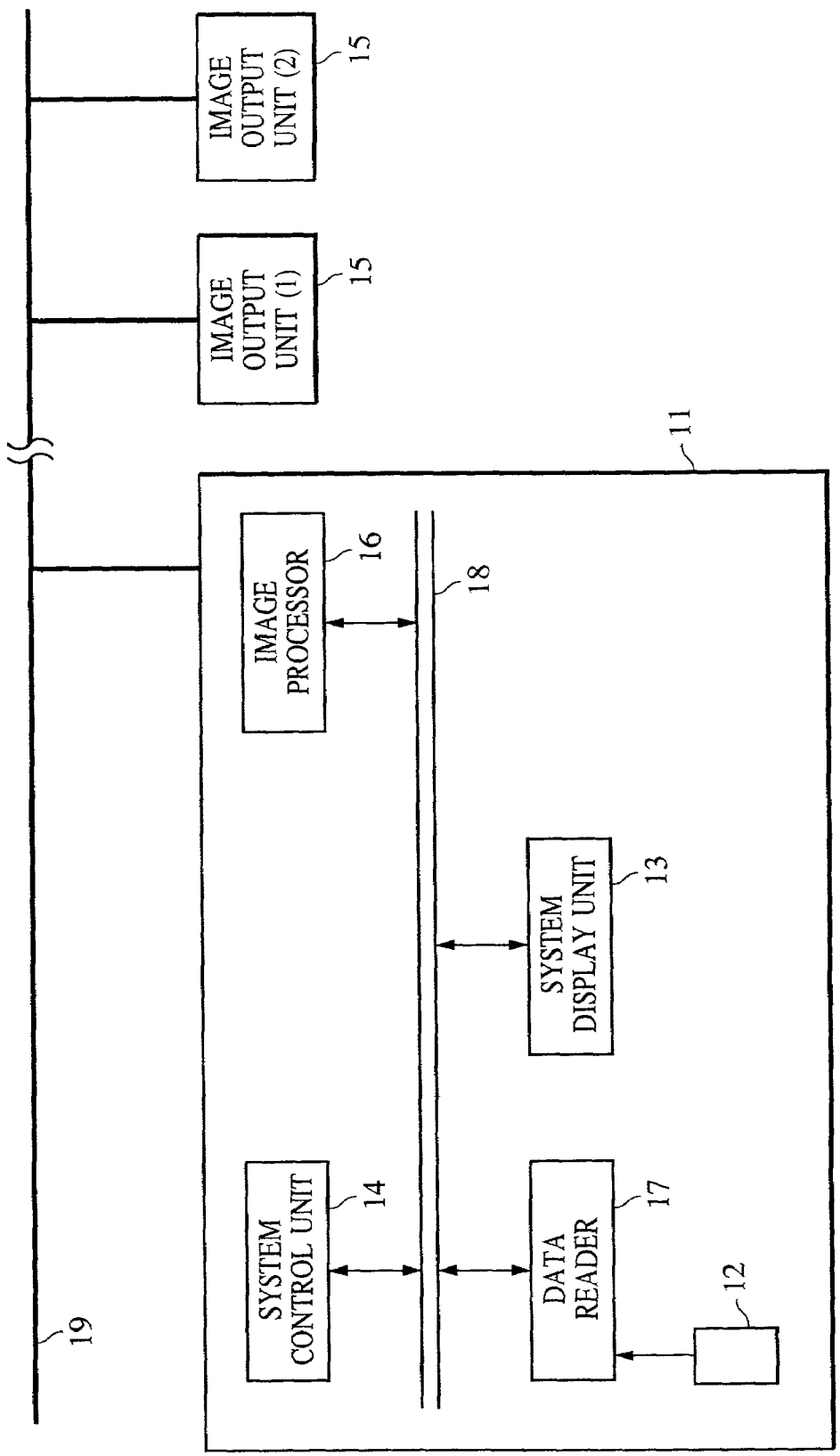
FIG. 1 is a block diagram of the configuration of an image forming system according to a first embodiment of the present invention.

FIG. 1 shows an image forming system according to a first embodiment of the present invention, for automatically selecting a desired image from among images recorded in an information storage medium and for outputting (printing) the selected image data to an image output unit on a network.

Referring to FIG. 1, the image forming system includes an information transmitting unit 11 which includes a system display unit 13, a system control unit 14, an image processor 16, a data reader 17, and a data bus 18. The data reader 17 reads an information storage medium (memory card) 12. The information transmitting unit 11 and image output units 15 are interconnected via a network 19. The information transmitting unit 11 is provided at a customer side. The image output units 15 include, for example, color laser beam printers and color ink jet printers, and are provided at a service shop which offers printing services.

The information storage medium 12 records therein image output instruction data and image data, which will be described hereinafter. The image output instruction data includes an IP address and a printer name of each output destination, i.e., each of the image output units 15, output count, and instruction data that designates image data to be output.

The data reader 17 reads the image output instruction data and the image data which are recorded in the information storage medium 12 and transmits the read image data to the data bus 18. The system display unit 13 includes a user interface (hereinafter referred to as a "UI") for displaying processing execution instructions and processing states.

The system control unit 14 controls each part of the image forming system and thus controls the overall operation of the image forming system. The system control unit 14 includes a central processing unit (CPU), a read only memory (ROM), a random access memory (RAM), and the like (all of which are not shown). The image processor 16 under the control of the system control unit 14 receives the image data transmitted to the data bus 18, converts the image data to output data to be output to the network 19, and outputs the output data to the network 19.

The image output units 15 each receive the image data processed by the image processor 16 and the image output instruction data via the network 19 such as a local area network (LAN) and outputs images in accordance with instructions based on the image output instruction data. The network 19 may be wireless, by cable, or by a combination of the two. The network 19 can also utilize infrared communication.

Information Storage Medium Area

The information storage medium 12 shown in FIG. 1 will now be described. The information storage medium 12 is a storage medium such as SmartMedia, CompactFlash memory, a floppy disk, a CD-R, a digital versatile disk (DVD), a mini disk (MD), a magneto-optical disk (MO), or the like. Referring to FIG. 2A, the internal area is mapped into an image processing data region 21 and an image data region 22.

Referring to FIG. 2C, the image data region 22 is a file containing pieces of image data as recording contents. Each piece of the image data has a name. In the first embodiment, files 28 to 32 are named "IMGxxx" (xxx are integers for identification purposes). Although the image data are assumed to be JPEG data in the first embodiment, it is actually not limited to the JPEG data and may be TIFF image data or PICT image data.

The image processing data region 21 is a file containing instruction information for outputting image data written in American Standard Code for Information Interchange (ASCII) code which is a standard code system for alphanumeric characters. Referring to FIG. 2B, this area includes a HEADER section 23 and JOB sections 24 to 27.

The HEADER section 23 includes recording information concerning the entire information storage medium, such as a data creation date, file saving date, user's (customer's) address, name, and the like.

In contrast, the JOB sections 24 to 27 are sections for recording JOB information required for outputting the foregoing image data. The JOB sections 24 to 27 record the identification number indicating the order of image data, the name of an image file to be output, output count, the format of the image file, outputting method, and the like. In the first embodiment, each JOB file is named "JOBxxx" (xxx are integers for identification purposes).

In the past, a person who captured a particular image separately recorded the image capturing date, conditions, and the like. According to the first embodiment, such data are now recorded on the same information storage medium 12, together with the image files. Furthermore, information indicating which image from among recorded images should be printed by a designated number of sheets is also recorded on the information storage medium 12. Therefore, it is not necessary to additionally write down instructions, which were necessary in the past when requesting the printing.

By recording information on a printer that performs the outputting of each JOB in the respective JOB sections 24 to 27 in the information storage medium 12, it is possible to read the information when printing and to automatically print out an image, which is designated by the information, by a designated number of sheets using a designated output destination (printer).

FIG. 3 shows an example of image processing data information in the image processing data region 21 of the information storage medium 12 shown in FIG. 2.

The HEADER section 23 describes the saving date (SAVE DATE) and user information such as user name (USER NAME), user telephone number (PHONE NUMBER), and the like.

The JOB sections 24 to 27 are each controlled by PRT PID, which is the job identification number (JOB ID). In the example shown in FIG. 3, there are four JOBs.

The first JOB section 24 (PRT PID=001) indicates a job of outputting an image 28 whose image data name (IMG SRC) is IMG001 to the output destination printer (DTN PRN) whose IP address is 152.15.12.122, in which the output type (PRINT TYPE) is normal output (NORMAL), the output count (PRINT CNT) is one, and the sheet size (PAPER SIZE) is A4. The image data name (IMG SRC) is written using a relative path, indicating that the image data format (IMG FMT) is JPG.

The second JOB section 25 indicates a job in which three sheets (PRINT CNT=3) of an image 29 named IMG002 are to be double-sided printed (PRINT TYPE=DOUBLE), and the output destination printer (DTN PRN) has an IP address of 152.15.12.123.

The third JOB section 26 indicates a job in which five sheets of an image 30 named IMG003 are to be printed by the printer having an IP address of 152.15.12.122. The sheet size is automatically selected (PAPER SIZE=AUTO).

The fourth JOB section 27 indicates that five sheets of an image 31 named IMG004 are to be printed by a color printer having a printer name (DTN PRN) of COLOR PRN.

Editing JOB Data

The JOB information recorded in the information storage medium 12, which are shown in FIGS. 2B and 3, can be generated and edited by an image input device (not shown) such as a digital camera, by a personal computer, or by an information storage medium data editing system (not shown).

In the first embodiment, the system display unit 13 of the image forming system shown in FIG. 1 is used to edit the JOB information.

FIG. 4 shows a display screen of the system display unit 13 which is a user interface section of the first embodiment. The system display unit 13 also serves as a data display unit of the information transmitting unit 11. For example, the system display unit 13 can be a liquid crystal display having a touch panel. In this case, each key described below is a soft key.

Referring to FIG. 4, the system display unit 13 includes a print key 41, a program key 42, a preview key 43, a display section 44 such as a monitor (hereinafter referred to as a "monitor"), arrow keys 45, a confirm key 46, and a cancel key 47.

Figure 5A:
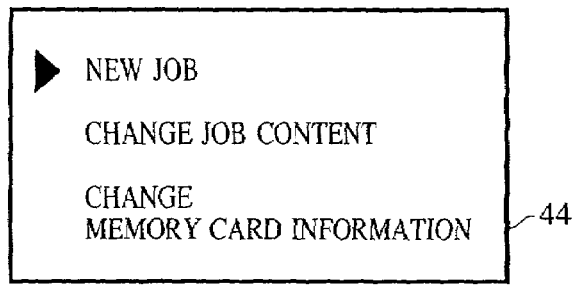
FIGS. 5A to 5E are plan views of examples of displays of the system display unit shown in FIG. 4.

An operator (customer) sets the memory card (information storage medium) 12 in the data reader 17 shown in FIG. 1. When the operator presses the program key 42, the screen display of the monitor 44 is changed to a selection screen shown in FIG. 5A. On the screen shown in FIG. 5A, the operator selects processing such as JOB addition, JOB modification, and the like.

For example, when the operator wants to change user information or the like recorded in the HEADER section 23 in the memory card 12, the operator shifts a cursor (indicated by a triangular arrow) to "change memory card information" using the arrow keys 45. When the confirm key 46 is pressed, the display of the monitor 44 is changed to a user information changing screen in which the user information in the memory card 12 can be changed. When changing contents of the JOB information already stored in the memory card 12, i.e., when adding an image, changing the print count, or deleting the JOB, the cursor is moved to "change JOB content". When the confirm key 46 is pressed, the display of the monitor 44 is changed to a JOB content changing screen, and hence the JOB information can be changed.

In this example, new JOB information will be added, which will now be described in detail.

Figure 5B:
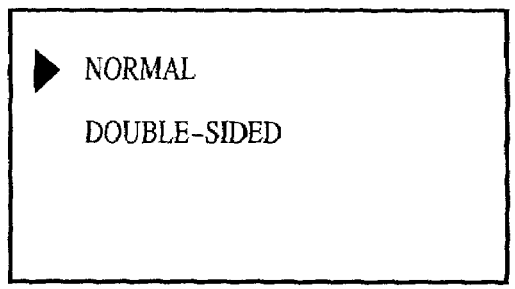

The cursor is moved to "new JOB" using the arrow keys 45. When the confirm key 46 is pressed, the display of the monitor 44 is changed to a printing selection screen, as shown in FIG. 5B. This screen is a screen in which the type of output of the image data stored in the memory card 12 is selected. For example, when performing the normal output, "normal" is selected using the arrow keys 45. When performing the double-sided output, "double-sided" is selected by the arrow keys 45 and is confirmed by the confirm key 46.

Figure 5C:
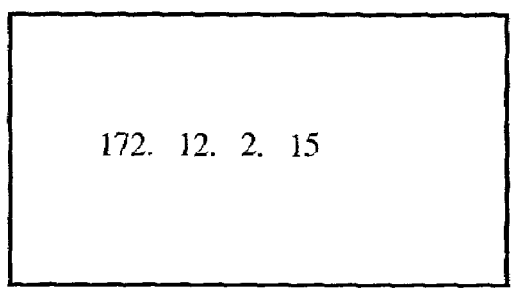

Subsequently, the screen is changed to that shown in FIG. 5C in which the output destination printer is designated. In this example, the printer is designated using an IP address. The operator uses the arrow keys 45 and sets the IP address of a printer designated as the output destination from among the printers (image output units) 15 connected to the network 19 or the IP address of a host computer (not shown) to which a printer is connected.

Figure 5D:
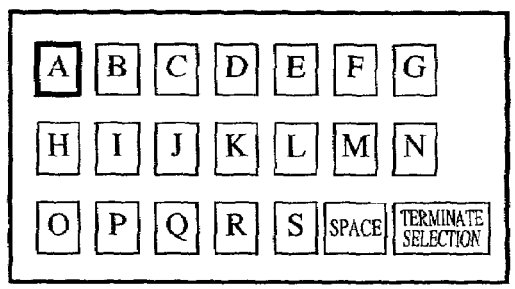
Figure 5E:
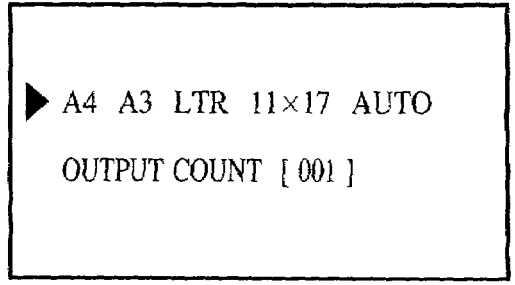

The data reader 17 reads images recorded in the memory card 12 and displays all images on the monitor 44 in the form of an index, as shown in FIG. 5D. The operator uses the arrow keys 45 and selects an image or images to be output from among the displayed images and confirm the selection using the confirm key 46. When terminating the image selection, "terminate selection" is selected by the arrow keys 45 and is then confirmed by the confirm key 46.

When the image selection is terminated, the monitor screen is changed to that shown in FIG. 5D in which the print count and the sheet size are to be selected. On this screen, the print count and the sheet size are selected, and the selection is confirmed by pressing the confirm key 46.

Accordingly, the JOB settings are terminated by the foregoing operation performed by the operator. The screen of the monitor 44 returns to the screen shown in FIG. 5A. The information that has been set up until this point, in addition to the identification number (PRT PID), is added to the JOB sections (the JOB sections 24 to 27 in FIG. 2B) of the memory card 12, and the information is thus recorded. When further performing JOB settings, the process similar to that described above is repetitively performed.

Concerning the JOB that has been set now and the JOBs that were previously set, when the preview key 43 shown in FIG. 4 is pressed, the monitor 44 displays the JOB sections which have been previously set. By pressing the arrow keys 45, preview images of the other JOB sections can be displayed.

Figure 6:
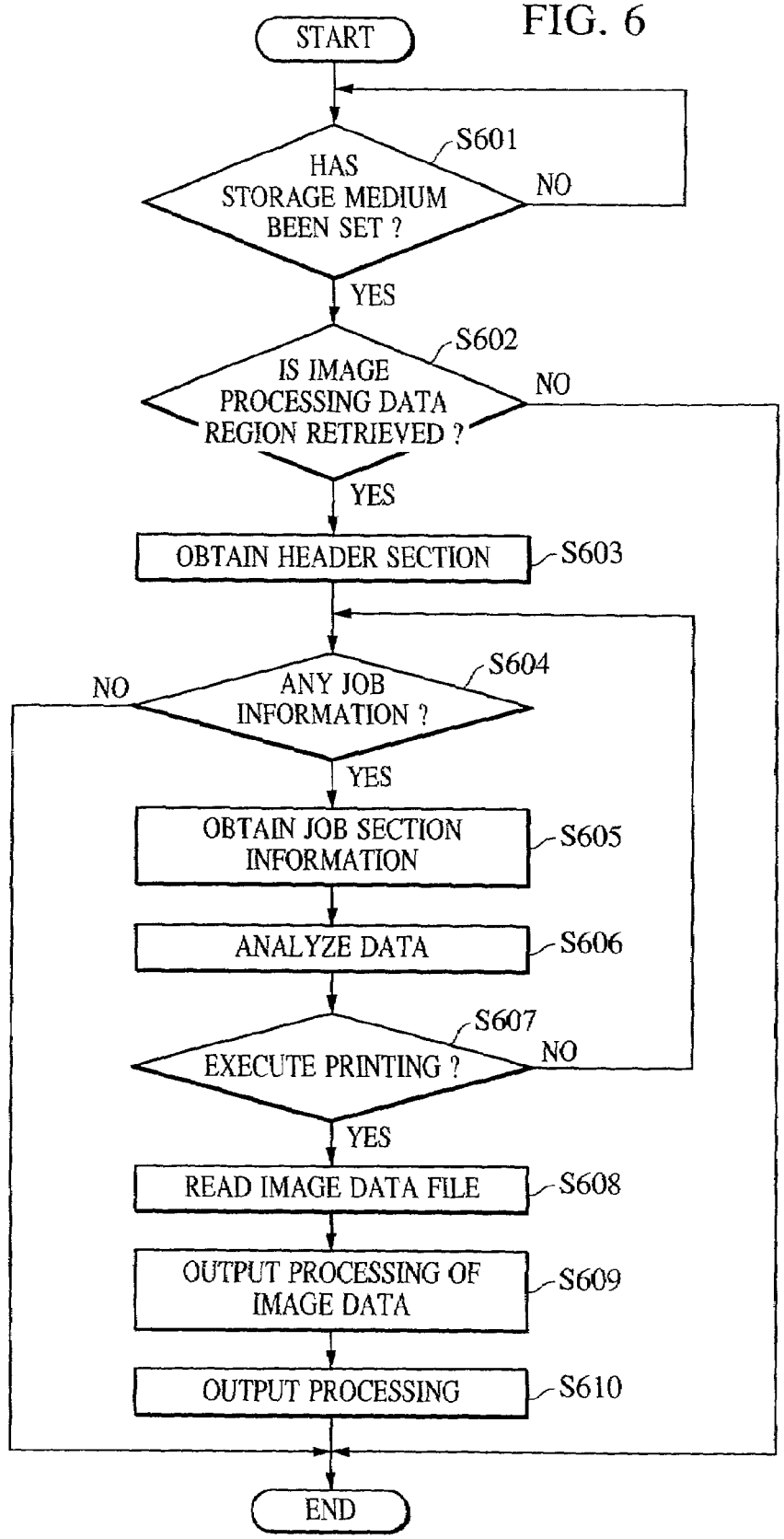
FIG. 6 is a flowchart showing an output process performed by a system control unit.

FIG. 6 is a flowchart showing a controlling process performed by the system control unit 14 for outputting data. Using a specific example, the controlling process is described hereinafter.

An operator (customer) sets the memory card (information storage medium) 12 in the data reader 17. When the print key 41 on the system display unit 13 is pressed by the operator, in step S601, the system control unit 14 determines whether the memory card 12 is set in the data reader 17. If the system control unit 14 determines that the memory card 12 is set, in step S602, the system control unit 14 refers to the content recorded in the memory card 12 set in the data reader 17 and checks for the HEADER section and the JOB sections (image processing data region 21). If these files are not detected, the process is terminated.

If the HEADER section and the JOB sections are detected in step S602, the display on the monitor 44 of the system display unit 13 is changed to display the message "now printing". In step S603, the process reads the HEADER information of the memory card 12 into a RAM (not shown) in the system control unit 14.

In step S604, the process checks for the JOB sections (JOB information) in the memory card 12. If no JOB section is retrieved, the process is terminated. If the JOB sections are retrieved, in step S605, the process obtains information in the JOB sections. In step S606, the system control unit 14 analyzes the contents of the read HEADER section and the contents of the subsequent JOB section.

In step S607, the process designates the output destination printer based on an IP address designated in the JOB section, which is obtained from the JOB analysis result in step S606, and determines whether the data can be printed by the designated printer. If the designated printer is not available or the designated printer cannot be located, and hence if it is impossible to perform the printing, the process determines that the printing cannot be performed. The process does not perform the printing and returns to step S604 in which the subsequent JOB section is to be read.

If the process determines in step S607 that the data can be printed by the output destination printer designated by the JOB section, in step S608, the process reads the image data in the memory card 12 using the data reader 17, the image data being designated by the JOB section, and transmits the read image data to the image processor 16 through the data bus 18. When the image data has been compressed by the image processor 16, decompression is performed in accordance with the image, and then the image is read. For example, when the JOB section designates a job of data processing for double-sided outputting, two pieces of image data are read. When the JOB section designates a job of four-sheet printing, four pieces of image data are read into the JOB file.

In step S609, the image processor 16 performs image processing such as enlarging, reducing, or layout of the read image in accordance with information from the system control unit 14. In step S610, the processed image data, the output count information, and the like are processed in order to output (print) an image. The processed data are transmitted to the image output unit 15 that corresponds to the IP address designated by the JOB section, and the image output unit 15 prints out the data.

When the image output is performed by the image output unit 15, the process checks for the subsequent JOB section. If the subsequent JOB section is detected, the output process is similarly performed (steps S605 to S610). The process is repetitively performed until no JOB section remains.

The present invention can be applied to a system consisting of a plurality of units, such as a host computer, an interface device, a reader, and a printer. The present invention is also applicable to an apparatus consisting of a single device, such as a memory card information transmitting apparatus.

The objects of the present invention can be achieved by providing a system or an apparatus with a recording medium (storage medium) that records therein software program code for implementing functions of the first embodiment, so that a computer (CPU or MPU) of the system or the apparatus can read the program code stored in the recording medium and thereby execute the program code.

In such cases, the program code read from the recording medium implements the functions of the first embodiment, and the recording medium that records therein the program code constructs the present invention.

Recording media for recording the program code and variable data such as tables include, for example, a floppy disk (FD), a hard disk, an optical disk, an MO, a compact disk-ROM (CD-ROM), a CD-R, a magnetic tape, a non-volatile memory card (IC memory card), and a ROM.

The functions of the first embodiment can be implemented by execution of the program code read by the computer. Alternatively, an operating system (OS) running on the computer can perform part or the entirety of the actual processing based on instructions from the program code, thereby implementing the functions of the first embodiment.

As described above, according to the first embodiment of the present invention, in a system for outputting image data stored in an information storage medium, image data and instruction data for giving instructions on output process contents are stored in the information storage medium. The image data and the instruction data are read, and the image data is automatically output in accordance with the instructions. Data that designates a printer for outputting the image data is added to the instruction data. In this way, the work of designating a printer, which was previously manually performed for each image, is now automatically performed. Therefore, the outputting operation at the image output device side is simplified, and the time for an image to be output is substantially reduced.

Second Embodiment

Overview of Printer System

Figure 7:
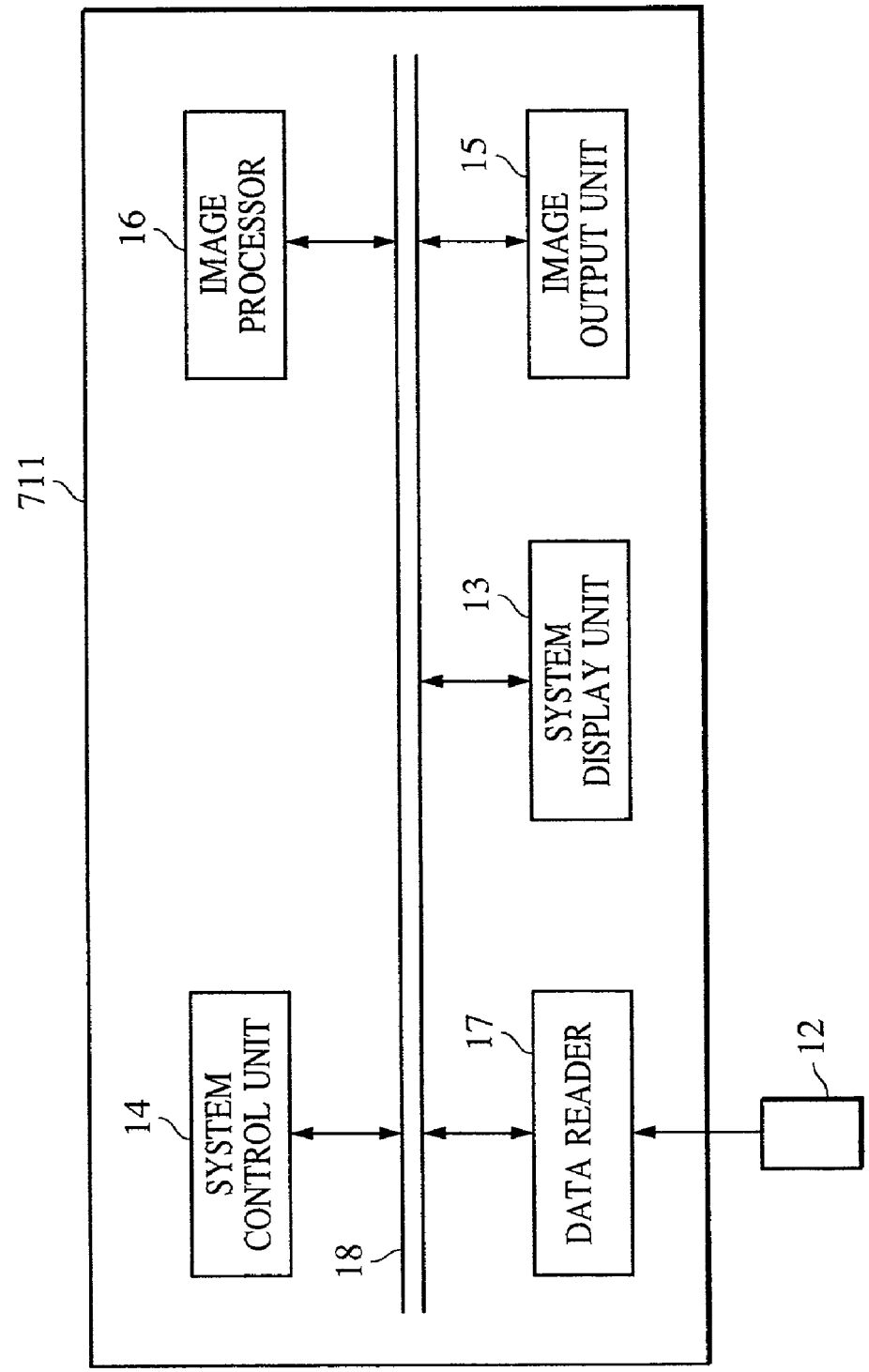
FIG. 7 is a block diagram of the entire configuration of a printer system according to a second embodiment of the present invention.

FIG. 7 shows the overall configuration of a printer system, which is an image output control system according to a second embodiment of the present invention.

A printer system 711 includes a system display unit 13, a system control unit 14, an image output unit 15, an image processor 16, a data reader 17, and a data bus 18. With this arrangement, the printer system 711 automatically selects a desired image from among images recorded in an information storage medium, such as a memory card 12, and prints out an image corresponding to the selected image data.

The data reader 17 has a driving function that enables the data reader 17 to receive and drive the memory card 12. The data reader 17 reads image output instruction data and image data recorded in the inserted memory card 12 and transmits the image data to the data bus 18. The driving function may be provided externally. The system display unit 13 includes a user interface (hereinafter referred to as a "UI") for displaying processing executing instructions and processing states.

The system control unit 14 includes a CPU, a ROM, a RAM, and the like (all of which are not shown). The system control unit 14 controls each part of the printer system 711 and thereby controls the overall operation of the printer system 711. The image processor 16, which is under the control of the system control unit 14, receives the image data transmitted from the data reader 17 to the data bus 18, converts the image data into reading output data for printing out the image data, and outputs the data. The image output unit 15 receives the reading output data and prints out the data.

Information Storage Medium Area

Referring to FIG. 2, the information storage medium exemplified by the memory card 12 shown in FIG. 7 is described hereinafter.

The information storage medium 12 according to the second embodiment of the present invention includes a readable/writable recording medium such as CompactFlash, SmartMedia, a floppy disk, a CD-R, a compact disk-rewritable (CD-RW), a DVD, an MD, an MO, or the like. Image data input by an image input device, such as a digital camera or a scanner, which is an example of an image recording device of the second embodiment, and image processing data are recorded, which will now be described.

Referring to FIG. 2A, the internal area of the information storage medium 12 is mapped into an image processing data region 21 and an image data region 22.

Referring to FIG. 2C, the image data region 22 is a storage region for storing a file containing pieces of image data as recording contents. Each piece of the image data has a name. In the second embodiment, the file name is "IMGxxx". Although the image data are assumed to be JPEG data in the second embodiment, it is in practice not limited to the JPEG data and may be TIFF image data or PICT image data.

The image processing data region 21 is a storage region for storing a file containing instruction information for outputting image data written in ASCII code. Referring to FIG. 2B, the image processing data region 21 includes a HEADER section 23 and JOB sections 24 to 27. The HEADER section 23 includes recording information concerning the entire information storage medium 12, such as a data creation date, file saving date, user's address, name, and the like.

In contrast, the JOB sections 24 to 27 are sections for recording JOB information required for outputting the foregoing image data. The JOB sections 24 to 27 record the identification number indicating the order of image data, the name of an image file to be output, output count, the format of the image file, outputting method, and the like. In the second embodiment, the name of each JOB file is "JOBxxx".

In the past, a person who captured a particular image separately recorded on a memo the image capturing date, conditions, and the like. According to the second embodiment, such data are now recorded on the same information storage medium 12, together with the image files. Furthermore, information indicating which image from among recorded images should be printed by a designated number of sheets is also recorded on the information storage medium 12. Therefore, it is not necessary to additionally write down instructions on a memo or the like, which were necessary in the past when requesting the printing.

When information indicating whether to perform the normal single-sided printing or the double-sided printing and information indicating whether to perform the reduction-layout (index) output in which a plurality of images are reduced or the enlargement-layout output are included in the same information storage medium 12, it is possible to read the information when printing, to automatically analyze the information, and to automatically print out a designated image by a designated number of sheets using a designated output method.

Examples of the image processing data information recorded in the HEADER section 23 and the JOB sections 24 to 27 on the information storage medium 12 are shown below.

[HDR]
SAVE DATE=1999/12/15
USER NAME=YAMADA TARO
PHONE NUMBER=03-1234-5678

[JOB]
PRT PID=001
PRINT TYPE=NORMAL
PRT CNT=1
PAPER SIZE=A4
IMG FMT=JPG
IMG SRC=". ./ABCD/IMG001"

[JOB]
PRT PID=002
PRINT TYPE=DOUBLE
PRT CNT=3
PAPER SIZE=A4
IMAGE FMT=JPG
IMG SRC=". ./ABCD/IMG002"". ./ABCD/IMG003"

[JOB]
PRT PID=003
PRINT TYPE=REDUCE-LAYOUT4
PRT CNT=5
PAPER SIZE=A4
IMG FMT=JPG
IMG SRC=". ./ABCD/IMG004"". ./ABCD/IMG005"". ./ABCD/IMG006"". ./ABCD/IMG007"

[JOB]
PRT PID=004
PRINT TYPE=REDUCE-LAYOUT4
PRT CNT=5
PAPER SIZE A4
IMG FMT=JPG
IMG SRC=". ./ABCD/IMG004""---- "". ./ABCD/IMG006"". ./ABCD/IMG007"

[JOB]
PRT PID=005
PRINT TYPE=ENLARGE-LAYOUT
PRINT TYPE SUB1=NUMBER
PRINT TYPE SUB2=16
PRT CNT=2
PAPER SIZE=A4

IMG FMT=JPG
IMG SRC=". ./ABCD/IMG008"

[JOB]
PRT PID=006
PRINT TYPE=ENLARGE-LAYOUT
PRINT TYPE SUB1=MAGNIFICATION
PRINT TYPE SUB2=400
PRT CNT=2
PAPER SIZE=A4
IMG FMT=JPG
IMG SRC=". ./ABCD/IMG009"

In the foregoing data, the first HEADER section [HDR] describes the saving date (SAVE DATE) and user information such as the user name (USER NAME), user's phone number (PHONE NUMBER), and the like.

The JOB sections are each controlled by the respective JOB ID, i.e., the PRT PID. In the above example, there are six JOBs which are numbered JOB sections 1 to 6 from the top.

The JOB section 1 indicates a job of outputting an image having an image data name (IMG SRC) of IMG001 in which the output type (PRINT TYPE) is normal (NORMAL), the output count (PRINT CNT) is one, and the image is to be output on A4-size sheets (PAPER SIZE). The image data name is written using a relative path, indicating that the image data format (IMG FMT) is JPEG (JPG).

The JOB section 2 indicates a job of outputting two images IMG002 and IMG003, respectively, by three sheets on both sides of each sheet (DOUBLE).

The JOB section 3 indicates a reduction-layout job. There are four types of reduction layout, and PRINT TYPE (RE-DUCE-LAYOUT4) indicates that the reduction layout is one of 2 in 1 (double-sided), 4 in 1 (double-sided), 8 in 1 (double-sided), and 9 in 1 (double-sided). In the above example, the job indicates the 4-in-1 reduction layout in which four images IMG004, IMG005, IMG006, and IMG007 are reduced, respectively, and are laid out on an A4-size sheet. Five sheets of the same page are to be output.

In the case of the 4-in-1 job, it is not necessary to have four images. When there are only three images and a portion corresponding to one image will not be printed, a non-image region instruction indicating the absence of an image is recorded at the position at which the image number of the absent image should be recorded.

The non-image region may not necessarily be placed at the end of the images. As in the JOB section 4, when the non-image region is in the middle of the image numbers, the layout position of the image number that corresponds to IMG005 will not be printed.

The JOB section 5 and the JOB section 6 indicate enlargement-layout (ENLARGE-LAYOUT) jobs. There are two modes in the enlargement layout, one of which is a number enlargement layout mode. In the number enlargement layout mode, the number of sheets on which an image is to be enlarged and printed is designated, whereby the magnification is automatically computed. The other mode is a magnification enlargement layout mode in which the magnification (MAGNIFICATION) is designated, whereby the number of sheets required is automatically computed. These two modes are distinguishable from each other based on PRINT TYPE SUB1 and PRINT TYPE SUB2.

For example, the JOB section 5 indicates an example of the number enlargement layout in which an image IMG008 is enlarged and output on eight A4-size sheets, and two sets of the result will be made. The JOB section 6 indicates an example of the magnification enlargement layout mode in which an image IMG009 is enlarged 400% and is output.

Examples of Types of Image Outputs

Referring to FIGS. 8A to 8D, examples of images output by the image output control system of the second embodiment will now be described.

FIG. 8A shows an example of the normal output in which a piece of image data 31 is output on a single sheet 301. The normal output can be combined with variable-magnification processing, and hence reduction output or enlargement output can be performed.

FIG. 8B shows an example of the double-sided output in which two pieces of image data 31 and 32 are output on the front side 302 and the back side 303 of the sheet 301. The double-sided output can be combined with variable-magnification processing. Also, the processing of the front side 302 and the processing of the back side 303 may be made different.

FIG. 8C shows an example of the reduction layout in which a plurality of images 34 to 37 are reduced and output on a surface of a single sheet 304. The reduction layout is selectable from among 2 in 1, 4 in 1, 8 in 1, 9 in 1, 16 in 1, etc. In this example, the 4-in-1 reduction layout is set. When the layout and the paper size are selected, the magnification is automatically computed. The read images are varied in accordance with the computed magnification and are laid out. The reduction-layout output can be combined with the foregoing double-sided output. In this case, the images are reduced and laid out on the front side and the back side of the sheet 304, respectively.

FIG. 8D shows an example of the enlargement layout in which a piece of image data 31 is enlarged and output on a plurality of sheets 311 to 322. The enlargement layout has two types: number enlargement layout in which the number of sheets onto which an image is to be output is designated, thus automatically computing the magnification; and magnification enlargement layout in which the enlargement magnification is designated, thus automatically computing the number of sheets onto which an image is to be output. By arranging the sheets together on which the image is output, an enlarged image is produced which is larger than one sheet of paper, which could not be performed by normal output. The enlargement layout can be utilized in creating a large poster or the like.

Editing JOB Data

The JOB information can be generated and edited by an image input device such as a digital camera, a personal computer, an information storage medium data editing system, or the like.

In the second embodiment, the system display unit 13 of the printer system 711 shown in FIG. 7 is used to edit data.

FIG. 4 shows a display screen of the system display unit 13 which is a user interface of the image output control system according to the second embodiment of the present invention. The system display unit 13 also serves as a data display unit of the printer system 711.

Referring to FIG. 4, the system display unit 13 includes a print key 41, a program key 42, a preview key 43, a display screen 44 of a display device such as a monitor (hereinafter referred to as a "monitor"), arrow keys 45, a confirm key 46, and a cancel key 47.

Figure 9A:
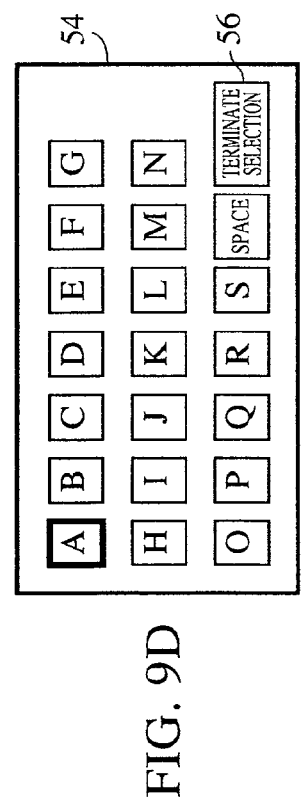
FIGS. 9A to 9E illustrate examples of operation displays displayed on a system display unit of the image output control system according to the second embodiment of the present invention.

An operator at a photo studio or the like sets the memory card 12 in the data reader 17. When the operator presses the program key 42, the display of the monitor 44 is changed to a selection screen 51 shown in FIG. 9A. In accordance with the selection screen 51, the operator selects processing such as JOB addition, JOB content modification, memory card information modification, or the like.

For example, when the operator wants to change user information or the like recorded in the HEADER section 23 in the memory card 12, the operator shifts a cursor 50 to "change memory card information" using the arrow keys 45. When the confirm key 46 is pressed, the display of the monitor 44 is changed to a screen which will be described below, so that the user information in the memory card 12 can be changed.

When changing contents of the JOB information already stored in the memory card 12, i.e., when adding an image, changing the print count, or deleting the JOB, the cursor 50 is moved to "change JOB content". When the confirm key 46 is pressed, the display of the monitor 44 is changed to a JOB content changing screen (not shown), and hence the JOB information can be changed.

In this example, new JOB information will be added, which will now be described in detail.

Figure 9B:
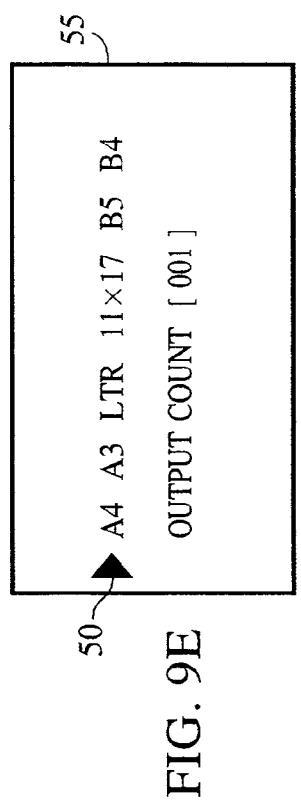

The cursor 50 is moved to "new JOB" using the arrow keys 45 on the selection screen 51. When the confirm key 46 is pressed, the display of the monitor 44 is changed to a printing selection screen 52 shown in FIG. 9B. In accordance with the printing selection screen 52, the type of output of the image data stored in the memory card 12 is selected. For example, when performing the normal output, "normal" is selected using the arrow keys 45, which in turn is confirmed by pressing the confirm key 46. Subsequently, the monitor 44 displays a screen (not shown) in which the magnification and the print count are to be set, and hence the operator sequentially adjusts the job settings.

When performing the double-sided output, "double-sided" is selected on the printing selection screen 52. When performing the reduction layout output, "reduction layout" is selected. When performing the enlargement layout output, "enlargement layout" is selected.

In this example, the reduction layout output is performed, which will now be described.

Figure 9C:
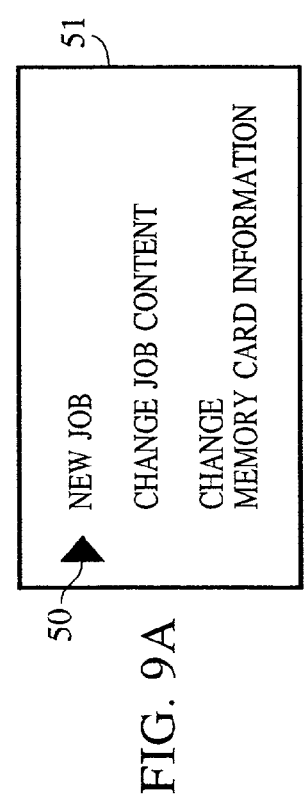

The operator adjusts the cursor 50 to "reduction layout" using the arrow keys 45. When the confirm key 46 is pressed, the display of the monitor 44 is changed to a layout type selection screen 53 shown in FIG. 9C. In accordance with the layout type selection screen 53, the operator can select the type of reduction layout. The cursor 50 is shifted on the reduction layout type selection screen 53 using the arrow keys 53 to a desired layout, and then the confirm key 46 is pressed. For example, when the operator wants to perform the 4-in-1 double-sided output, the operator sets the cursor 50 to "4 in 1" and presses the confirm key 46 to confirm the selection.

Figure 9D:
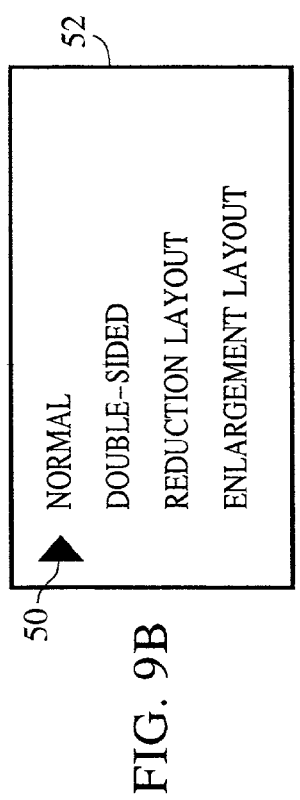
Figure 9E:
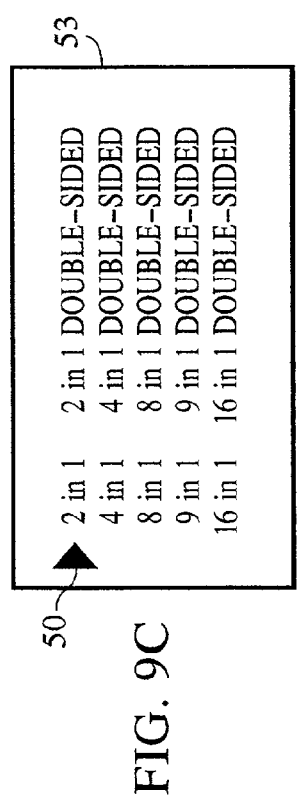

When the layout is confirmed on the layout type selection screen 53, the data reader 17 reads all images recorded in the memory card 12. Referring to FIG. 9D, the images are displayed in the form of an index 54 on the monitor 44. The operator selects an image to be output from among the images using the arrow keys 45 and confirms the selection using the confirm key 46.

When an image to be output is confirmed (image A in the case shown in FIG. 9D), the monitor 44 is changed to display a screen (not shown) asking the operator whether to perform detailed settings for the selected image. If processing such as trimming and the insertion of a title is necessary for the selected image, the execution of detailed settings is selected. Subsequently, the screen is changed to a detailed setting selection screen (not shown). In contrast, if it is not necessary to perform the detailed settings, default processing of the selected image is performed.

When the other images are sequentially selected in accordance with the index 54, the image selection can be terminated by selecting a "terminate selection" button 56.

When the image selection is terminated, the display on the monitor 44 is changed to a count and paper size selection screen 55 shown in FIG. 9D. In accordance with the count and paper size selection screen 55, the operator selects the output count and the output paper size and then presses the confirm key 46.

Accordingly, the job setting in the reduction layout output process is terminated. Subsequently, each piece of job information that has been set up until this point is recorded in the respective JOB section in the memory card 12 in which the identification number (product identification) is associated therewith.

Concerning the JOB that has been set now and the JOBs that were previously set, the monitor 44 displays the set JOB sections by pressing the preview key 43. By pressing the arrow keys 45, preview images of the other JOB sections can be displayed.

Referring to FIG. 6, a process of outputting image data is described below.

An operator sets the memory card 12 in the data reader 17. When the print key 41 on the system display unit 13 is pressed by the operator, in step S601, the process determines whether the memory card 12 is set in the data reader 17. When the image output unit 15 is in a wait state, such as when the printer system 711 is out of paper, or when there is a jam, it is impossible to output image data. In such cases, the system display unit 13 displays this, and it becomes impossible to press the print key 41.

If the process determines that the memory card 12 is set, in step S602, the process refers to the content recorded in the memory card 12 set in the data reader 17 and checks for the HEADER section and the JOB sections in the image processing data region 21. If these sections are not detected, the process is terminated.

If the HEADER section and the JOB sections are detected in step S602, the display on the system display unit 13 is changed to display the message "now printing". In step S603, the process obtains information in the HEADER section in the memory card 12 and writes the obtained information into a RAM (not shown) in the system control unit 14. In step S604, the process checks for information in the JOB sections in the memory card 12. If no information is retrieved, the process is terminated.

If information in the JOB sections is retrieved in step S604, in step S605, the process obtains information in the JOB sections. In step S606, the process analyzes the contents of the read HEADER section and the contents of the subsequent JOB section. Based on the analysis result, the process determines, in step S607, whether to execute the printing of the read JOB section. If the determination is negative, the process returns to step S604 and reads the subsequent JOB section.

If the process determines to execute the printing of the JOB section, in step S608, the process uses the data reader 17 to read an image data file in the memory card 12, which is designated by the JOB section, and transmits the image data to the image processor 16 through the data bus 18. If the image data has been compressed or the like, decompression in accordance with the image is performed, and then the image is read. For example, when the JOB section designates a job of data processing for double-sided outputting, two pieces of image data are read. When the JOB section designates a 4-in-1 job, four pieces of image data are read into the JOB file.

In step S609, the image processor 16 performs image output process such as enlarging, reducing, or layout of the image read in accordance with information from the system control unit 14. In step S610, the processed image data, the output count information, and the like are processed in order to output (print) an image. The processed data are transmitted to the image output unit 15, and the image output unit 15 prints out the data.

When the image is printed out, the process returns to step S604 and checks for the subsequent JOB section. If the subsequent JOB section is detected, the output process is similarly performed (steps S605 to S610). The loop processing is repetitively performed until no JOB section remains.

As described above, according to an image output control system, an image recording apparatus, an information storage medium, an image processing apparatus, an image processing method, and a storage medium of the embodiments of the present invention, image output instruction data that gives instructions on the output of an image is recorded in the information recording medium using the image recording apparatus. The image output instruction data is read by the image output control system, and hence image data is automatically output in accordance with the read instruction data. Although the printing operation in the past required complex processing such as taking notes and an unnecessarily long period of time, the printing operation is now automatically performed and is simplified.

When image data layout information in an output job is added to the image output instruction data, the output method such as the double-sided printing or the layout can be designated. In doing so, an image can be easily and automatically output using a layout desired by a user.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An output control apparatus which is connected to a plurality of image output devices, comprising:
   reading means for reading, from a removable storage medium in which image data and image output instruction data are stored, the image output instruction data specifying one of the plurality of image output devices which prints the image data; and
   output means for outputting the image data stored by said removable storage medium to the image output device specified based on the image output instruction data read by said reading means.

2. An output control apparatus according to claim 1, wherein the image output instruction data includes an IP address or a printer name of the image output device which is the output destination.

3. An output control apparatus according to claim 1, wherein said reading means reads the image data from the storage medium in accordance with an output instruction.

4. An output control apparatus according to claim 1, wherein said output means does not output the image data to the image output device when no image output device that corresponds to the image output instruction data is detected.

5. An output control apparatus according to claim 1, wherein:
   the image output instruction data includes instruction data that designates an output count and image data to be output; and
   the image output device outputs the image data designated by the image output instruction data by the output count designated by the image output instruction data.

6. An output control apparatus according to claim 1, further comprising:
   instruction input means for inputting instruction data that designates an output count, image data to be output, and the image output device which is the output destination; and
   writing means for writing the instruction data input by said instruction input means as the image output instruction data in the storage medium.

7. An output control apparatus according to claim 1, wherein said storage medium includes at least one of SmartMedia, CompactFlash memory, a compact disk-recordable, a floppy disk, a digital versatile disk, a mini disk, and a magneto-optical disk.

8. An output control apparatus according to claim 1, wherein the image output instruction data includes instruction data that instructs the printing of image data for a plurality of pages on a single sheet of paper.

9. An output control apparatus according to claim 1, wherein the image output instruction data includes instruction data that instructs the printing of image data for a single page on a plurality of sheets of paper.

10. An output control apparatus according to claim 1, wherein the image output instruction data includes instruction data that instructs the printing of the image data on both sides of a sheet of paper.

11. An output control method comprising:
    a reading step of reading, from a removable storage medium in which image data and image output instruction data are stored, the image output instruction data specifying one of the plurality of image output devices which prints the image data; and
    an output step of outputting the image data stored by said removable storage medium to the image output device specified based on the image output instruction data read in said reading step.

12. An output control method according to claim 11, wherein the image output instruction data includes an IP address or a printer name of the image output device which is the output destination.

13. An output control method according to claim 11, wherein, in said reading step, the image data is read from the storage medium in accordance with an output instruction.

14. An output control method according to claim 11, wherein, in said output step, the image data is not output to the image output device when no image output device that corresponds to the image output instruction data is detected.

15. An output control method according to claim 11, wherein:
    the image output instruction data includes instruction data that designates an output count and image data to be output; and
    the image output device outputs the image data designated by the image output instruction data by the output count designated by the image output instruction data.

16. An output control method according to claim 11, further comprising:
an instruction input step of inputting instruction data that designates an output count, image data to be output, and the image output device which is the output destination; and
a writing step of writing the instruction data input in said instruction input step as the image output instruction data in said storage medium.

17. An output control method according to claim 11, wherein the storage medium includes at least one of SmartMedia, CompactFlash memory, a compact disk-recordable, a floppy disk, a digital versatile disk, a mini disk, and a magneto-optical disk.

18. An output control method according to claim 11, wherein the image output instruction data includes instruction data that instructs the printing of image data for a plurality of pages on a single sheet of paper.

19. An output control method according to claim 11, wherein the image output instruction data includes instruction data that instructs the printing of the image data for a single page on a plurality of sheets of paper.

20. An output control method according to claim 11, wherein the image output instruction data includes instruction data that instructs the printing of the image data on both sides of a sheet of paper.

21. A computer-readable storage medium having recorded thereon an output control program, said output control program comprising:
code for a reading step of reading, from a removable storage medium in which image data and image output instruction data are stored, the image output instruction data specifying one of the plurality of image output devices which prints the image data; and
code for an output step of outputting the image data read by said removable storage medium to the image output device specified based on the image output instruction data read by said code for a reading step.

22. A storage medium according to claim 21, wherein the image output instruction data includes an IP address or a printer name of the image output device which is the output destination.

23. A storage medium according to claim 21, wherein said code for a reading step reads the image data from the storage medium in accordance with an output instruction.

24. A storage medium according to claim 21, wherein the image data is not output to the image output device by said code for an output step when no image output device that corresponds to the image output instruction data is detected.

25. A storage medium according to claim 21, wherein:
the image output instruction data includes instruction data that designates an output count and image data to be output; and
the image output device outputs the image data designated by the image output instruction data by the output count designated by the image output instruction data.

26. A storage medium according to claim 21, said output control program further comprising:
code for an instruction input step of inputting instruction data that designates an output count, image data to be output, and the image output device which is the output destination; and
code for a writing step of writing the instruction data input by said code for an instruction input step as the image output instruction data in the storage medium.

27. A storage medium according to claim 21, wherein the storage medium includes at least one of SmartMedia, CompactFlash memory, a compact disk-recordable, a floppy disk, a digital versatile disk, a mini disk, and a magneto-optical disk.

28. A storage medium according to claim 21, wherein the image output instruction data includes instruction data that instructs the printing of the image data for a plurality of pages on a single sheet of paper.

29. A storage medium according to claim 21, wherein the image output instruction data includes instruction data that instructs the printing of the image data for a single page on a plurality of sheets of paper.

30. A storage medium according to claim 21, wherein the image output instruction data includes instruction data that instructs the printing of the image data on both sides of a sheet of paper.

31. An output control program product stored in a computer-readable medium performing an output control program, said output control program comprising:
code for a reading step of reading, from a removable storage medium in which image data and image output instruction data are stored, the image output instruction data specifying one of the plurality of image output devices which prints the image data; and
code for an output step of outputting the image data stored by said removable storage medium to the image output device specified based on the image output instruction data read by said code for a reading step.

32. An output control program product according to claim 31, wherein the image output instruction data includes an IP address or a printer name of the image output device which is the output destination.

33. An output control program product according to claim 31, wherein the image data is read from the storage medium by said code for a reading step in accordance with an output instruction.

34. An output control program product according to claim 31, wherein the image data is not output to the image output device by said code for an output step when no image output device that corresponds to the image output instruction data is detected.

35. An output control program product according to claim 31, wherein:
the image output instruction data includes instruction data that designates an output count and image data to be output; and
the image output device outputs the image data designated by the image output instruction data by the output count designated by the image output instruction data.

36. An output control program product according to claim 31, said output control program further comprising:
code for an instruction input step of inputting instruction data that designates an output count, image data to be output, and the image output device which is the output destination; and
code for a writing step of writing the instruction data input by said code for an instruction input step as the image output instruction data in the storage medium.

37. An output control program product according to claim 31, wherein the storage medium includes at least one of SmartMedia, CompactFlash memory, a compact disk-recordable, a floppy disk, a digital versatile disk, a mini disk, and a magneto-optical disk.

38. An output control program product according to claim 31, wherein the image output instruction data includes instruction data that instructs the printing of the image data for a plurality of pages on a single sheet of paper.

39. An output control program product according to claim 31, wherein the image output instruction data includes instruction data that instructs the printing of the image data for a single page on a plurality of sheets of paper.

40. An output control program product according to claim 31, wherein the image output instruction data includes instruction data that instructs the printing of the image data on both sides of a sheet of paper.

41. An output control system comprising:
a plurality of image output devices for outputting images based on image data;
reading means for reading, from a removable storage medium in which image data and image output instruction data are stored, the image output instruction data specifying one of the plurality of image output devices which prints the image data; and
output means for outputting the image data stored by said removable storage medium to one of the image output devices specified based on the image output instruction data read by said reading means.

42. An output control system according to claim 41, wherein the image output instruction data includes an IP address or a printer name of the image output device which is the output destination.

43. An output control system according to claim 41, wherein said reading means reads the image data from the storage medium in accordance with an output instruction.

44. An output control system according to claim 41, wherein said output means does not output the image data to the image output device when no image output device that corresponds to the image output instruction data is detected.

45. An output control system according to claim 41, wherein:
the image output instruction data includes instruction data that designates an output count and image data to be output; and
the image output device outputs the image data designated by the image output instruction data by the output count designated by the image output instruction data.

46. An output control system according to claim 41, further comprising:
instruction input means for inputting instruction data that designates an output count, image data to be output, and the image output device which is the output destination; and
writing means for writing the instruction data input by said instruction input means as the image output instruction data in the storage medium.

47. An output control system according to claim 41, wherein the storage medium includes at least one of Smart-Media, CompactFlash memory, a compact disk-recordable, a floppy disk, a digital versatile disk, a mini disk, and a magneto-optical disk.

48. An output control system according to claim 41, wherein the image output instruction data includes instruction data that instructs the printing of the image data for a plurality of pages on a single sheet of paper.

49. An output control system according to claim 41, wherein the image output instruction data includes instruction data that instructs the printing of the image data for a single page on a plurality of sheets of paper.

50. An output control system according to claim 41, wherein the image output instruction data includes instruction data that instructs the printing of the image data on both sides of a sheet of paper.

* * * * *

UNITED STATES PATENT AND TRADEMARK OFFICE
CERTIFICATE OF CORRECTION

PATENT NO. : 7,061,641 B2  Page 1 of 1
APPLICATION NO. : 09/795316
DATED : June 13, 2006
INVENTOR(S) : Tatsuhiko Hirai It is certified that error appears in the above-identified patent and that said Letters Patent is hereby corrected as shown below:

COVER PAGE:
(30) Foreign Application Priority Data, "2000/059528" should read -- 2000-059528 -- and "2000/059529" should read -- 2000-059529 --.

COLUMN 6:
Line 58, "confirm" should read -- confirms --.

COLUMN 17:
Line 9, "said" should read -- the --.

COLUMN 19:
Line 10, "31,wherein" should read -- 31, wherein --.

Signed and Sealed this

Tenth Day of April, 2007

JON W. DUDAS
*Director of the United States Patent and Trademark Office*